United States Patent [19]
Ihara

[11] Patent Number: 5,814,901
[45] Date of Patent: Sep. 29, 1998

[54] HARMONIC BLOCKING AT SOURCE TRANSFORMER

[75] Inventor: Satoru Ihara, Burnt Hills, N.Y.

[73] Assignee: General Electric Company, New York, N.Y.

[21] Appl. No.: 892,289

[22] Filed: Jul. 14, 1997

[51] Int. Cl.⁶ ........................................................ H02J 3/01
[52] U.S. Cl. ............................................. 307/105; 333/177
[58] Field of Search ................................ 307/105; 333/12, 333/167–177; 327/551; 363/39

[56] References Cited

U.S. PATENT DOCUMENTS 4,308,575  12/1981  Mase ........................................ 307/105

Primary Examiner—Richard T. Elms
Attorney, Agent, or Firm—Carl B. Horton; Fishman, Dionne, Cantor & Colburn

[57] ABSTRACT

Apparatus and method to separate the harmonic problems in the load side circuit of an electrical power distribution system from the source side circuit of a source transformer in a reliable and economical manner. The electrical power distribution system includes at least a source of AC electrical power, a load, and the connection from the source to the load including a source transformer, electrical conductors, wires, or cables. A part of the load is the non-linear load which injects harmonics. A harmonic blocking filter, comprised of an existing source transformer and a series combination of an auxiliary transformer and a capacitor, is connected in parallel with the source transformer. The MVA rating of the auxiliary transformer is chosen to be equal or smaller than the MVA rating of the source transformer, and the leakage impedance of the auxiliary transformer is chosen to be equal or larger than the impedance of the source transformer.

9 Claims, 2 Drawing Sheets

HARMONIC BLOCKING AT SOURCE TRANSFORMER

BACKGROUND OF THE INVENTION

Our invention relates generally to improvements in power distribution systems, and more particularly, to an improved design that is reliable and economical to more effectively separate the harmonic problems between the source side circuit and the load side circuit of a source transformer.

The power industry has recognized the problem of power system harmonics since the 1920's when distorted voltage and current waveforms were observed on power lines. The previously known power sources include network non-linearities from loads such as rectifiers, inverters, welders, arc furnaces, and voltage controllers. However, the levels of harmonics on distribution systems from these sources have been insignificant in the past. Today, the levels of harmonic voltages and currents on distribution systems are becoming a serious problem with power networks being subjected to new harmonic sources such as the increasing use of electronic equipment such as televisions, personal computers, and many other "smart" appliances. Modern appliances increasingly employ energy conservation measures, such as those for improved motor efficiency and load matching, having power semi-conductor devices, converters and inverters, etc. for their operation, which often produce irregular voltage and current waveforms that are rich in undesirable harmonics including fifth, seventh, eleventh, and thirteenth harmonic components. For example, in certain populated cities of the world such as Tokyo where there is a high concentration and usage of electronic equipment, the distortion at the fifth harmonic has been observed to be highly-correlated with prime television-viewing hours. Such non-linear loads draw square wave or non-linear pulse-like currents instead of the sinusoidal currents drawn by conventional linear loads (e.g., resistors, inductors, and capacitors). As a result, those harmonic currents flow through the predominantly source impedance of the electric supply network, causing distortion of the AC line voltage.

Such harmonic distortion is undesirable for a number of reasons. The un-filtered harmonics can affect other customers. One or more of the non-linear load sections inject harmonic currents and distort the source voltage to which the other load sections are subject to in the absence of filtering. Sensitive load sections connected to the same network may experience operational difficulties. The harmonics can interfere with telephone and other communication systems. The harmonic currents can also result in overheated conductors in conduits and panel boxes. The harmonics flow through transformers and into motors and generators, causing significantly increased I²R losses in the windings of transformers, motors and generators. The electric power supplied by the source increases due to the harmonic losses in various places.

Technology exists to substantially reduce the harmonic currents drawn by the most offending loads through better load design. However, the costs of retrofitting installed equipment, such as installing filters at each harmonic generating source can be prohibitive. Furthermore, this is not a practical solution since it requires the installation of filters at each and every device being the source of the harmonics. If not, the first filters going into service will carry the full burden of harmonic duties and get overloaded and damaged. It is necessary to prevent the harmonic current flow from the feeders with the harmonic sources into other feeders with installations of harmonic filters.

There are various ways to control or limit these harmonic current and the distortion voltage problem including: 1) employing more sophisticated converters that inject much less harmonics; 2) adding power line conditioners which effectively isolate loads from the power system; 3) installing shunt harmonic filters to remove the offending harmonics; and 4) employing active filters.

Employing more sophisticated, expensive converters for the sole purpose of reducing harmonics is often not economically viable and practical. The purchasers of the converters, or the end-users, get none or little benefits from reducing the harmonic injection. Therefore, they have no incentive to purchase and install these sophisticated and expensive converters that inject much less harmonics.

Power line conditioners can be used to isolate load harmonic currents from the input AC line. However, power line conditioners are a very expensive solution if their sole function is to reduce harmonic currents.

Shunt harmonic filters can be designed and installed to provide small impedance paths for the harmonic current and thus remove the ill effects of the offending harmonics. Shunt harmonic filters are currently employed as one of the more economically viable and practical solutions. However, this solution becomes technically more difficult as the harmonics generating loads proliferate and the source side harmonic problems become more severe.

Active filters represent an emerging technology relying upon a feedback loop with a single energy storage element and converters, minimizing the difference between the actual waveform and the desired waveform. Active filters are rather cost-prohibitive.

A harmonic audit of some power system configurations in some populated cities, such as Tokyo, reveals that the harmonic distortions can be magnified by the network configurations. A very small harmonic current generated by the load can be magnified to large currents in the distribution and transmission circuits due to resonance conditions between the inductance of the source reactance and the capacitance of the cables installed in distribution and transmission circuits.

The harmonic currents can be blocked with a blocking filter installed in series with feeders from flowing into other segments of the power system network. A blocking filter consists of a capacitor and an inductor electrically connected in parallel. The inductors of blocking filters are often large in size and expensive because they must carry full load current as well as the maximum fault current, both of which are fundamental frequency currents. Hence, blocking filters have seldom been used.

The subject invention enables segmentation of the power system network such that the problem within one part of the network can be resolved within that part inexpensively, taking advantage of existing equipment in the power distribution system network with the design of a novel blocking filter. The invention eliminates the need for the expensive inductor for a blocking filter by utilizing the leakage reactance of an existing source transformer as an inductor.

OBJECTS OF THE INVENTION

It is, therefore, an object of the present invention to provide a novel and improved apparatus and method to resolve the harmonic problem such that the solution in one part of the network can be resolved in that part without involving other parts of the network.

A further object of this invention is to provide a novel blocking filter that is simple in construction, as well as being inexpensive to build and implement.

Another object of this invention is to provide a novel blocking filter that utilizes some of the equipment already existed in the network.

Further objects and features of the invention will be readily apparent to those skilled in the art from the following specification which includes the appended claims and drawings.

SUMMARY OF THE INVENTION

The invention, accordingly, provides a harmonic blocking filter comprising a series combination of a small auxiliary transformer and a capacitor, which is placed in parallel with an existing source transformer. Said blocking filter is designed to be resonant at an offending harmonic frequency. The apparent power (MVA) rating of the auxiliary transformer can be chosen to be smaller than the MVA rating of the source transformer.

DESCRIPTION OF THE PREFERRED EMBODIMENT

Figure 1:
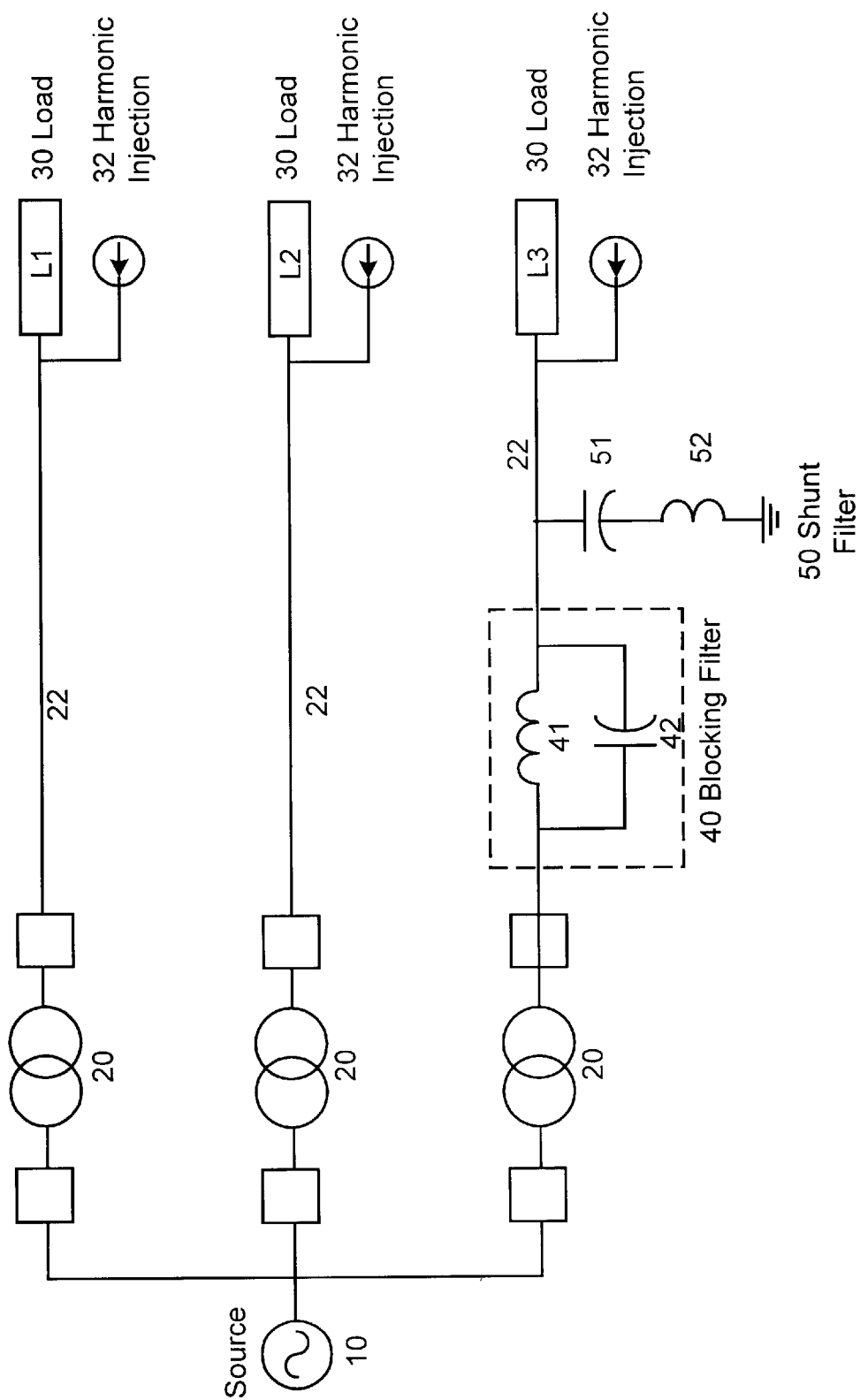
FIG. 1 is a diagram of distribution feeders with a harmonic filter in accordance with the prior art.

FIG. 1 shows a diagram of distribution feeders with harmonic filters in the prior art. The electrical power is supplied to loads 30 from a source 10 through source transformers 20 and feeders 22 at a fundamental frequency of 50 Hz or 60 Hz. Parts of the loads 30 may be non-linear loads with harmonic injections 32. The figure shows only three loads, L1, L2, and L3. There can be more or fewer loads; accordingly, there can be more or fewer source transformers and feeders. Moreover, multiple of feeders can be connected to one source transformer, one feeder can be connected to multiple of source transformers, and multiple of feeders can be connected to multiple of source transformers through a common bus.

When one of the loads (e.g., L3) is the only load with significant harmonic injection, an economically viable, sound engineering practice is to install a shunt harmonic filter 50 to provide a low-impedance path for the offending harmonic injection. This solution prevents the offending harmonic current from flowing into the source 10 and other loads (L1 and L2). A shunt harmonic filter can be composed of a capacitor 51 and an inductor 52 electrically connected in series. A blocking filter is not necessary as long as the source side circuit (source 10, loads L1 and L2, their source transformers 20 and feeders 22) is free of harmonic injection.

However, if the source side circuit is full of harmonic injections, and/or if the voltage waveform of the source is significantly distorted, then it is necessary to install a blocking filter 40 in addition to the shunt filter 50 as in FIG. 1, such that the shunt filter provides the low-impedance path only to the harmonic injection which the shunt filter is designed for. Otherwise, the offending harmonic current flowing from the harmonic injections of the source side circuit will overheat the source transformers 20, as well as overload and damage the shunt filter 50. A prior art blocking filter can be composed of an inductor 41 and a capacitor 42 as shown in FIG. 1. The shunt filter and the blocking filter can be tuned to similar frequencies such that their impedances are small and large, respectively, for the offending harmonic injection. The inductor 41 of the blocking filter must be sized to carry the full load current as well as the maximum fault current; consequently, it is quite large and expensive.

Figure 2:
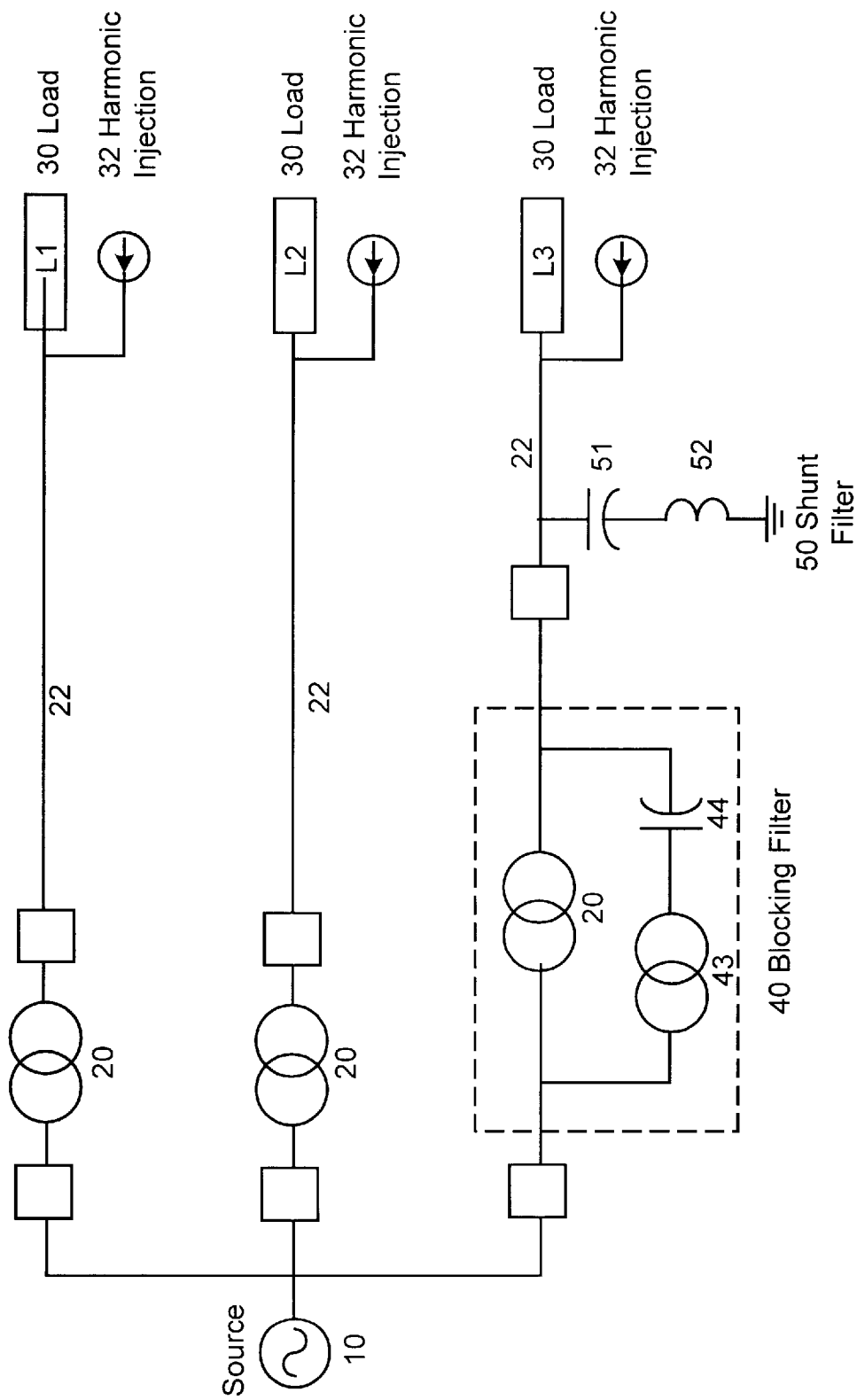
FIG. 2 is a diagram of distribution feeders with a harmonic blocking filter in accordance with the present invention.

FIG. 2 shows a diagram of distribution feeders with a harmonic blocking filter in accordance with the present invention. The blocking filter 40 comprises an existing source transformer 20, a small auxiliary transformer 43 and a capacitor 44. A series combination of an auxiliary transformer 43 and a capacitor 44 is connected electrically in parallel to the existing source transformer 20. The leakage reactances of the source and auxiliary transformers provide inductive reactances, and the capacitor provides the capacitive reactance. The source transformer 20 is designed for the full load current and the maximum fault current. By selecting the parameters of the auxiliary transformer 43 and the capacitor 44 in the blocking filter 40 of the present invention according to known electrical theories, the blocking filter will exhibit a large impedance at a selected frequency as the prior art blocking filter of FIG. 1. The auxiliary transformer 43 should be sized such that its leakage impedance is substantially equal or larger than that of the source transformer 20, and its nameplate MVA rating should be less than or substantially equal to the MVA rating of the source transformer 20.

Table 1 shows the parameters of an example fifth harmonic blocking filter formed with an existing 500 kV to 77 kV, 200 MVA source transformer (20) with 15% leakage reactance, a 500 kV to 77 kV, 10 MVA auxiliary transformer (43) with 5% leakage reactance, and a 6.8 kV, 165 kVAR (three-phase total) capacitor (44). The source frequency is 60 Hz, and the fifth harmonic frequency is 300 Hz. The table shows the impedance values at 60 Hz and 300 Hz, the continuous and fault duties for each component and combinations of components. All the parameter values shown in the table are based on a 77 kV basis.

TABLE 1

| | Blocking Filter at Source Transformer Parameter Values | | | | | |
|---|---|---|---|---|---|---|
| | Impedance at 60 Hz | Continuous Duty | | Fault Duty | | Impedance at 300 Hz |
| | Z (ohm) | I (A rms) | V (V rms) | I (A rms) | V (V rms) | Z (ohm) |
| Source Transformer T1 | j4.45 | 1,510 | 6,700 | 10,110 | 45,000 | j22.23 |
| Auxiliary Transformer T2 | j29.65 | 8 | 240 | 55 | 1,630 | j148.25 |
| Capacitor C | −j852.30 | 8 | 6,820 | 5 | 46,880 | −j170.46 |
| Series T2 + C | −j822.65 | 8 | ,700 | 55 | 45,000 | −j22.21 |
| Blocking filter | j4.47 | 1,500 | 6,700 | 0,000 | 45,000 | −j24,686 (very large) |

The example as shown in Table 1 is for blocking the fifth harmonic. The blocking frequency can be varied by selecting different parameter values of the auxiliary transformer and the capacitor according to known electrical circuit theories. The invention is not limited to the embodiment shown, but a plurality of modifications and embodiments are feasible within the ability of those skilled in the art and without the exercise of the inventive faculty. Thus, it should be understood that various changes in form, detail, and application of the present invention may be made without departing from the spirit and scope of the invention.

What is claimed is:

1. An electrical power distribution circuit for connecting an AC source of electrical power to a non-linear load having a harmonic current of at least one harmonic frequency, comprising:

a source transformer having an input connected to said AC source and an output connected to the non-linear load, said source transformer having an MVA rating and an impedance; and a series circuit comprising an auxiliary transformer and a capacitor connected in series, said series circuit being connected in parallel with said source transformer forming a blocking filter, said blocking filter having a resonant frequency sufficiently matching that of a frequency of the harmonic current to provide impedance for attenuating substantially all of the harmonic current.

2. The power distribution circuit of claim 1 wherein said resonant frequency ranges between fifth through thirteenth harmonic frequency of the fundamental frequency of the AC source.

3. The power distribution circuit of claim 1 wherein said auxiliary transformer has an MVA rating that is substantially equal to the MVA rating of said source transformer.

4. The power distribution circuit of claim 1 wherein said auxiliary transformer has an MVA rating that is less than the MVA rating of said source transformer.

5. The power distribution circuit of claim 1 wherein said auxiliary transformer has an MVA rating that is less than thirty percent of the MVA rating of said source transformer.

6. The power distribution circuit of claim 1 wherein said auxiliary transformer has an MVA rating that is less than ten percent of the MVA rating of said source transformer.

7. The power distribution circuit of claim 1 wherein said auxiliary transformer has a leakage impedance in ohmic value that is substantially equal to the impedance of said source transformer in ohmic value.

8. The power distribution circuit of claim 1 wherein said auxiliary transformer has a leakage impedance in ohmic value that is larger than the impedance of said source transformer in ohmic value.

9. The power distribution circuit of claim 1 further comprising a shunt filter comprising an inductor and capacitor connected in series, said shunt filter connected between said output of said source transformer and ground potential to provide a low impedance path to ground for a harmonic current of a selected harmonic frequency.

* * * * *